No. 890,948. PATENTED JUNE 16, 1908.
L. I. WAITE.
TRELLIS.
APPLICATION FILED MAR. 24, 1908.
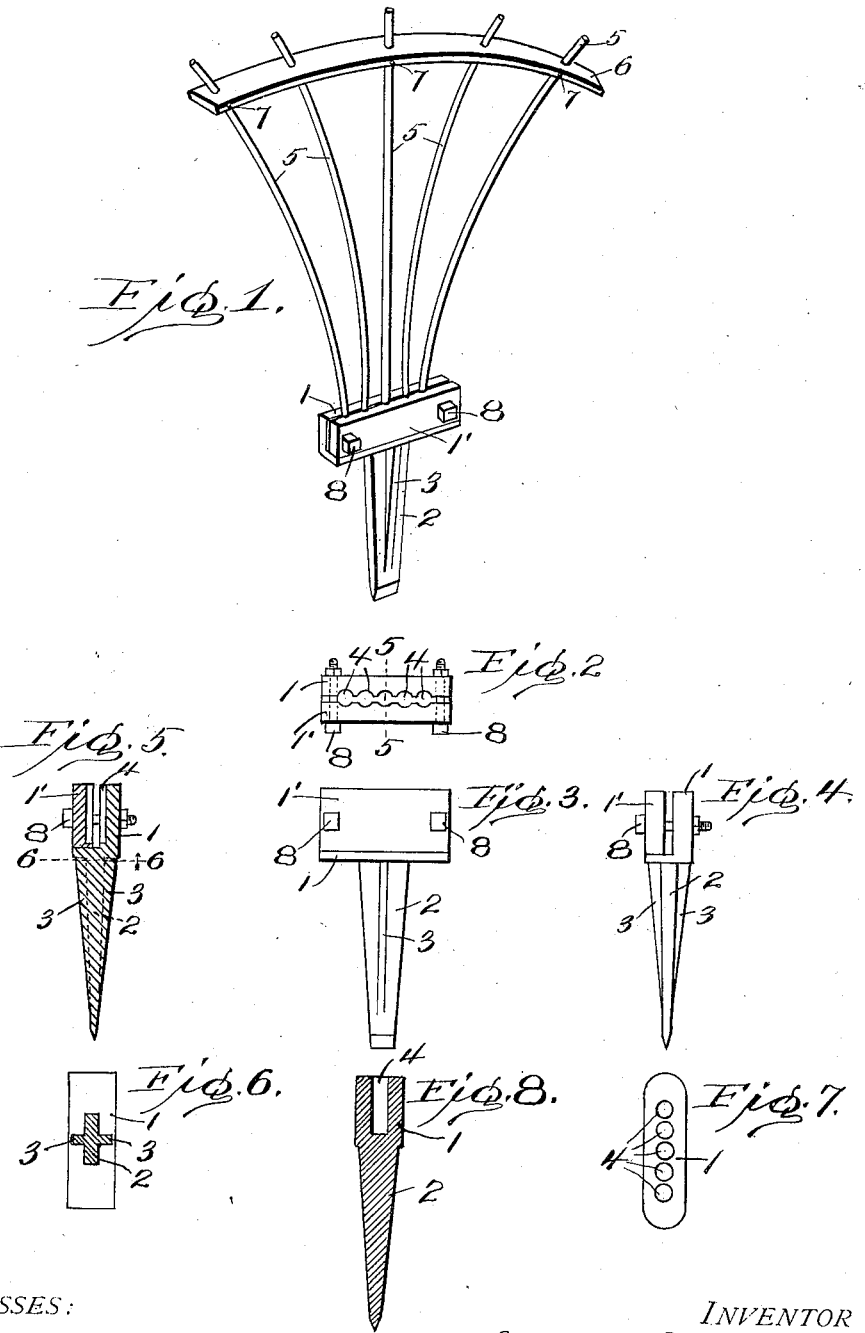
WITNESSES:
INVENTOR
Luther I. Waite,
BY Edgar M. Kitchin,
his Attorney.

UNITED STATES PATENT OFFICE.

LUTHER I. WAITE, OF NICHOLSON, PENNSYLVANIA.

TRELLIS.

No. 890,948.

Specification of Letters Patent.

Patented June 16, 1908.

Application filed March 24, 1908. Serial No. 422,948.

*To all whom it may concern:*

Be it known that I, LUTHER I. WAITE, a citizen of the United States, residing at Nicholson, in the county of Wyoming and State of Pennsylvania, have invented certain new and useful Improvements in Trellises; and I do hereby declare the following to be a full, clear, and exact description of the invention, such as will enable others skilled in the art to which it appertains to make and use the same.

In the accompanying drawing:—Figure 1 is a perspective view of a trellis embodying the features of the present invention. Fig. 2 is a top plan view of the cuff or rod holder thereof. Fig. 3 is a view in elevation of the same. Fig. 4 is an edge view of the same. Fig. 5 is a vertical section taken on the plane indicated by line 5, 5 of Fig. 2. Fig. 6 is a transverse section taken on the plane indicated by line 6, 6 of Fig. 5, and looking upwardly. Fig. 7 is a top plan view of a modified form of rod holder. Fig. 8 is a central, transverse vertical section taken therethrough.

Referring to the drawing by numerals, 2 indicates a cuff or rod holder from which a fin or prong 2 projects downwardly and is adapted to be thrust into the ground for supporting the structure in position. The prong 2 may be strengthened by longitudinal webs 3, 3. The cuff or holder 1 is provided with a series of alined sockets or recesses 4 adapted in operation to removably retain rods 5, 5, which extend upwardly from the cuff and are spread apart and preferably retained in their spread condition by a spreader bar 6. The lower ends of the sockets or recesses 4 are closed so as to form a base for the rods. The bar 6 is formed with an aperture for each rod 5, and the rods are passed through the respective apertures, and may be secured to the spreader by pins 7 extending through the material of the bar 6 and engaging the rods. Obviously as many rods 5 may be employed as desired, and of course, a corresponding number of recesses 4 will be formed in the cuff 1. The cuff 1 may be formed, as indicated in Figs. 7 and 8, as an integral structure, but to facilitate ready removal of the rods 5 and replacement thereof, the cuff 1 may be provided with a removable section 1' suitably bolted, as at 8, 8, or otherwise suitably detachably attached to the main portion of the cuff. The detachable portion 1' is adapted in operation to be drawn by the bolts 8 toward the main portion of the cuff, when the rods 5 are in position, sufficiently close to clamp the rods firmly in position.

The present improved trellis is adapted to be placed on the market as a complete structure, and for facilitation in shipment the rods 5 may be wrapped in a compact bundle with the bar 6 detached, and the cuff 1 also detached. When it is desirable to assemble the parts of the trellis, the rods 5 are placed in the sockets 4, and the upper ends of the rods thrust through the apertures of bar 6 formed to receive such upper ends, and the trellis is then in condition for use. To prevent displacement of the bar 6, the pin 7 may be passed through the material of the bar into engagement with the rods. Of course, the trellis may be shipped in a complete condition if preferred instead of in the knockdown condition mentioned, and when the trellis is to be disposed for supporting a vine or other plant, the fin 2 is thrust into the ground for firmly supporting the rods 5 in the desired position. When the plant has grown to a size such that the trellis is not adapted for its support, the rods 5 may be withdrawn from the sockets 4, the bolts 8 being loosened for this purpose if desired, and a new set of rods may be introduced which are of sufficiently greater length to adapt the trellis for use with the larger plant. It is thus obvious that the cuff or holder is adapted for the reception of any of a number of different trellises of various sizes, and in practice the adaptability of the holder to various lengths of rods materially increases the sphere of usefulness of the trellis. A further obvious advantage is the facility for the introduction of new rods in substitution for broken or decayed rods, and the cuff with its fin is preferably made of metal so as to insure durability, although of course the present invention comprehends the use of any desirable material.

The rods 5, 5 may obviously be made of any desired material and may be of any preferred cross sectional contour, as circular, square, oblong, octagonal, or otherwise as found desirable.

What I claim is:—

1. In a trellis, a support formed with a series of alined sockets, rods extending into said sockets and bodily sustained thereby, a spreader for the rods, and a ground engaging prong extending from said support.

2. In a trellis, a support formed with a series of alined sockets, and rods extending into said sockets and detachable therefrom and bodily sustained thereby.

3. In a trellis, a cuff formed with a series of recesses, a ground engaging fin extending from a portion of the cuff opposite the recesses, rods extending into said recesses, and a spreader engaging said rods the cuff serving to bodily sustain said rods and spreader.

4. In a trellis, a support comprising a relatively flat cuff formed along its length with alined sockets closed at their lower ends, and of sufficient length to receive and bodily sustain plant supporting rods and a ground engaging fin projecting from the under edge of said cuff.

5. In a trellis, a support comprising a clamp, rods engaged thereby, and ground engaging means extending from the clamp and adapted to support the parts in operative position.

6. In a trellis, a support comprising a cuff having a detachable portion, said cuff being adapted to receive rods between the main and detachable portions thereof, means for clamping the detachable portion to the main portion, ground engaging means extending from said cuff, and supporting rods clamped between said main and detachable portions.

7. In a trellis, a cuff having a detachable portion, rods disposed between the main and detachable portions of the cuff, bolts for clamping the detachable portion to the main portion of the cuff, and ground engaging means for the cuff.

8. As a new article of manufacture, a support for the rods of a trellis, comprising clamping members, means for drawing the clamping members together, and ground engaging means connected with one of said clamping members.

In testimony whereof I affix my signature in presence of two witnesses.

LUTHER I. WAITE.

Witnesses:
 OSCAR J. REYNOLDS,
 M. K. WALKER.